United States Patent [19]
Inukai

[11] Patent Number: 5,748,180
[45] Date of Patent: May 5, 1998

[54] POINTING DEVICE FOR CONTROLLING CURSOR MOVEMENT ON DISPLAY

[75] Inventor: Atsuomi Inukai, Nagoya, Japan

[73] Assignee: Brother Kogyo Kabushiki Kaisha, Nagoya, Japan

[21] Appl. No.: 333,838

[22] Filed: Nov. 3, 1994

[30] Foreign Application Priority Data

Nov. 5, 1993 [JP] Japan ................. 5-276983

[51] Int. Cl.$^6$ .................................................. G09G 5/08
[52] U.S. Cl. ........................................ 345/161; 345/158
[58] Field of Search ............................... 345/157, 161, 345/158, 168

[56] References Cited

U.S. PATENT DOCUMENTS

| | | | |
|---|---|---|---|
| 4,142,180 | 2/1979 | Burson | 345/161 |
| 4,614,406 | 9/1986 | Motoi | 345/204 |
| 4,680,577 | 7/1987 | Straayer et al. | 345/168 |
| 4,825,019 | 4/1989 | Fisher | 345/157 |
| 4,875,378 | 10/1989 | Yamazaki et al. | 345/173 |
| 4,968,257 | 11/1990 | Yalen | 345/157 |
| 5,327,161 | 7/1994 | Logan et al. | 345/173 |
| 5,453,758 | 9/1995 | Sato | 345/158 |
| 5,469,191 | 11/1995 | Smith, III et al. | 345/157 |
| 5,541,622 | 7/1996 | Engle et al. | 345/161 |

Primary Examiner—Richard Hjerpe
Assistant Examiner—Vui T. Tran
Attorney, Agent, or Firm—Kane, Dalsimer, Sullivan, Kurucz, Levy, Eisele and Richard, LLP

[57] ABSTRACT

Disclosed is a pointing device 1 including; a stick member 11 depressed by an operator; piezoelectric elements 13 each of which converts a stress exerted to the stick member 11 into a voltage; a voltage converting circuit 15 connected to the piezoelectric elements 13; a control part 19 to which a signal from the voltage converting circuit 15 is input and which transmits a signal for controlling cursor movement to a system board 17. The control part 19 detects the voltage produced in the piezoelectric elements 13 based on the signal from the voltage converting circuit 15 and stores such voltage as a hold value in a RAM 27. Further, the control part 19 transmits the signal for controlling cursor movement to the system board 17.

15 Claims, 7 Drawing Sheets

POINTING DEVICE FOR CONTROLLING CURSOR MOVEMENT ON DISPLAY

BACKGROUND OF THE INVENTION

1. Field of Invention

The present invention relates to a pointing device utilized by being connected to a personal computer or a word processor, through which a cursor is controlled to move on a display arranged in the personal computer or the word processor.

2. Description of Related Art

Conventionally, a keyboard or mouse is generally used as data input means for inputting data to a computer or word processor. Especially, as a data input device for inputting data while moving a cursor displayed on a display device, a so-called pointing device, in addition to the mouse, such as a trackball or tablet is utilized according to manner of data inputting.

By the way, the portable computer and word processor with compact size and light weight are recently proposed in general. In such the portable computer and word processor, to make use of merits thereof to the utmost limit, a very small pointing stick having equal ability to the above pointing device is produced in fact.

Figure 8:
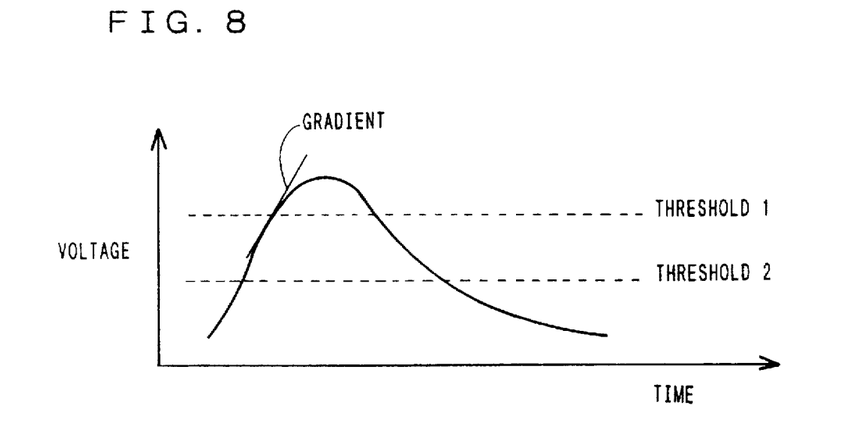
FIG. 8 is a graph showing a control method for controlling cursor movement utilized in the third embodiment.
Figure 9:
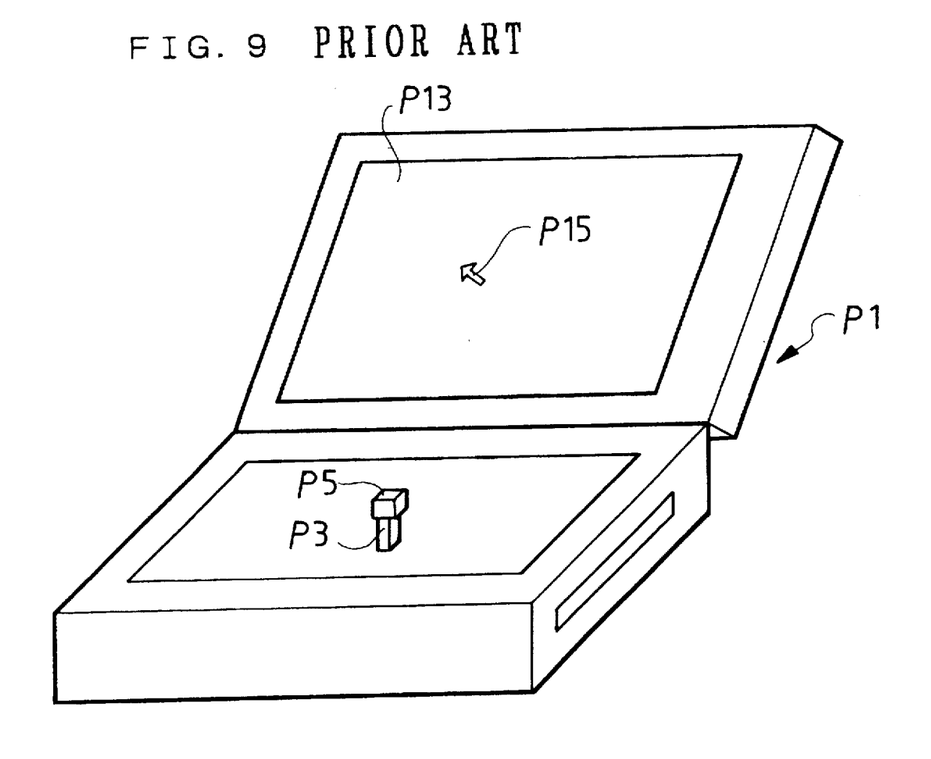
FIG. 9 is a perspective view showing a conventional pointing device.
Figure 10:
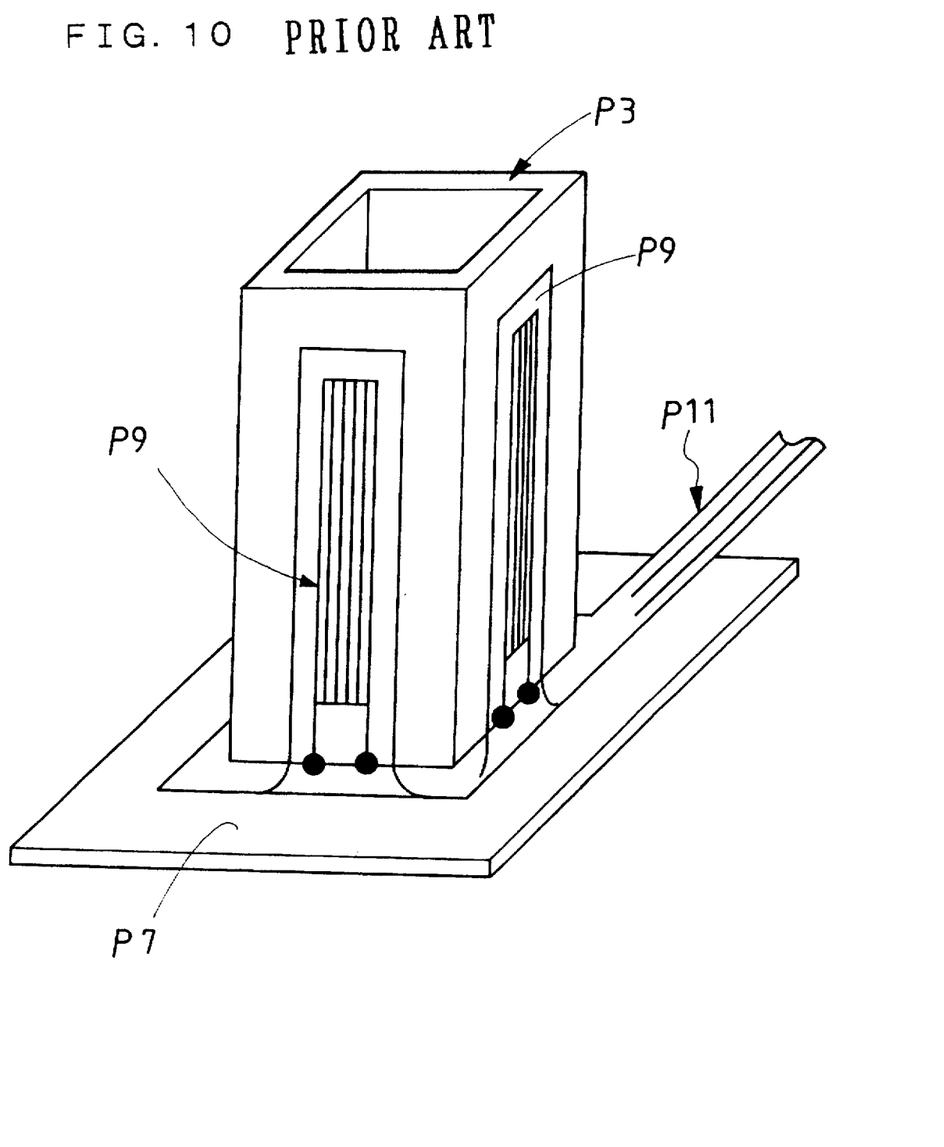
FIG. 10 is a perspective view of a stick member in the conventional pointing device.

Here, the pointing stick will be described hereinafter with reference to FIGS. 8 and 9. This type of the pointing stick, as shown in FIG. 8, is constructed from an operational stick member P3 (upon top portion of which a rubber cap P5 is covered), the stick member P3 being arranged among many keys (not shown) at a substantially central position on a keyboard of a note type (a thinner portable type) personal computer P1, for instance. The stick member P3, as shown in FIG. 9, has a square sectional shape and is formed into one body with a base plate P7. On each of side planes thereof, a strain gauge P9 is adhered by adhesive. Thus, four strain gauges P9 are totally adhered on the four side planes of the stick member P3. These strain gauges P9 are electrically connected to a detecting circuit (not shown) arranged on a system board through a flexible printed circuit board (FPC) P11.

In the pointing stick constructed according to the above, when an operator pressed the top portion of the stick member P3 by a finger, the stick member P3, that is, the strain gauges P9 are distorted, thereby resistance values of the strain gauges P9 are variably changed corresponding to distortion amount thereof. And the detecting circuit detects change of the resistance values and thereafter converts the detected values to electrical signals. As a result, a cursor P15 displayed on a display P13 is moved in accordance with the electric signals by the detecting circuit.

However, in the above pointing stick, the strain gauges P9 in each of which the resistance value is subtly changed based on a very little distortion amount occurring therein, are utilized. Thus, the resistance value of the strain gauge P9 is apt to be changed from predetermined value due to dispersion of various characteristics such as the shape, the material of the strain gauge P9 and the adhesion ability of the adhesive. Therefore, in order to correctly control movement of the cursor P15 on the display P13 by dissolving influence of such dispersion, it is necessary to individually amend movement of the cursor P15 through cursor control program. As a result, there is a problem that it is difficult to correctly control movement of the cursor P15.

And since the resistance value change of the strain gauge P9 is affected by a position where the strain gauge P9 is adhered, it is necessary that the strain gauges P9 should be precisely adhered onto the stick member P3. Thus, it is difficult to easily produce the pointing stick.

Further, there is a problem that producing cost of the pointing stick becomes very expensive since four of the strain gauges P9, each being expensive, have to be utilized to produce the pointing stick.

SUMMARY OF THE INVENTION

Accordingly, it is an object of the present invention to overcome the above mentioned problems and to provide a pointing device of stick type through which moving status of a cursor on a display can be easily controlled and which can be easily produced with low producing cost.

To accomplish the object, the present invention comprises a pointing device having a stick member for controlling cursor movement on a display, the pointing device comprising:

piezoelectric means arranged in the stick member, the piezoelectric means converting a stress exerted to the stick member into a voltage; and control means for controlling cursor movement corresponding to an outputting state of the voltage converted by the piezoelectric means.

In the pointing device of the present invention, when the stick member is depressed by an operator, a stress exerted to the stick member is converted into a voltage through the piezoelectric means arranged in the stick member. Thereafter, the control means controls cursor movement on the display corresponding to an outputting state of the voltage converted by the piezoelectric means. At that time, the control means controls moving amount, moving velocity and moving direction of the cursor.

Therefore, based on that the piezoelectric means, which has a characteristic that it can produce a voltage only when a stress is abruptly exerted thereto and can scarcely produce a voltage corresponding to a static stress, is utilized for detecting the stress exerted to the stick member, the pointing device is not affected by static dispersion such as shapes, material characteristics and arranging positions of the stick member, the piezoelectric means. Thus, not only it can be easily controlled cursor movement but also it can provide the pointing device with low cost which is easily produced.

And in case that the control means controls cursor movement by utilizing a peak voltage converted through the piezoelectric means, cursor movement can be suitably controlled when the piezoelectric means which does not produce so large voltage by the static stress is utilized.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the following drawings, wherein.

3

DETAILED DESCRIPTION OF THE PREFERRED EMBODIMENTS

Figure 1:
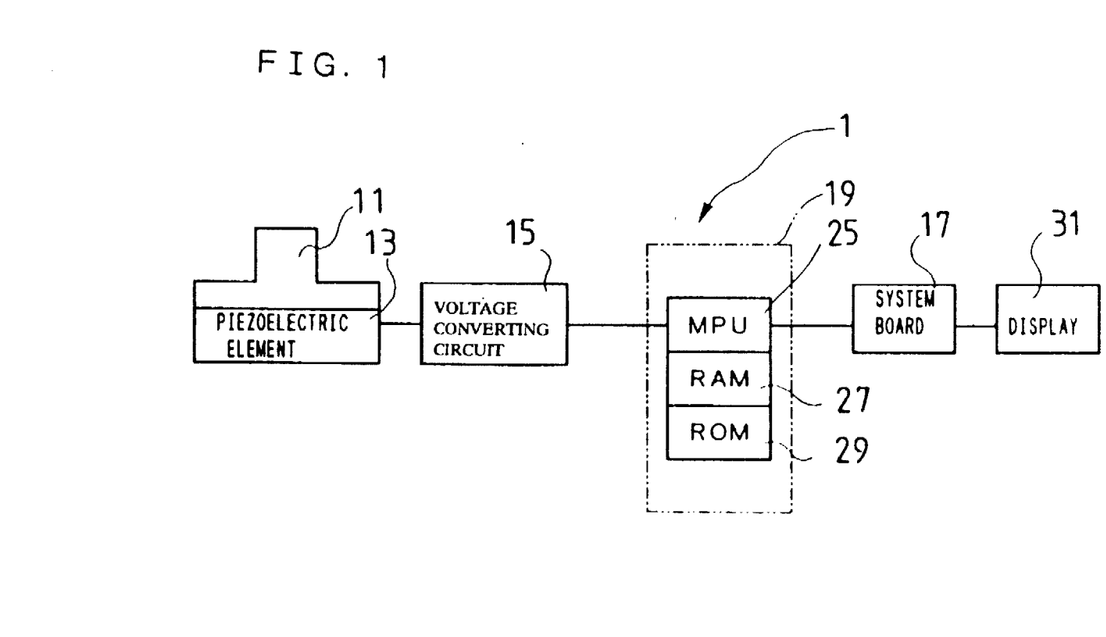
FIG. 1 is a block diagram of a pointing device according to the first embodiment of the present invention.

A detailed description of the preferred first embodiment of the pointing device will now be given referring to the accompanying drawings. As shown in FIG. 1, the pointing device 1 according to the first embodiment is basically constructed from a stick member 11 which is operated by an operator, piezoelectric elements 13 which convert stress exerted to the stick member 11 into voltages, a voltage converting circuit 15 connected to the piezoelectric elements 13 and a control part 19 to which signals are input from the voltage converting circuit 15 and which transmits electrical signals for controlling cursor movement to a system board 17.

Next, each of the stick member 11, the piezoelectric elements 13, the voltage converting circuit 15 and the control part 19 will be described hereinafter in detail.

Figure 2:
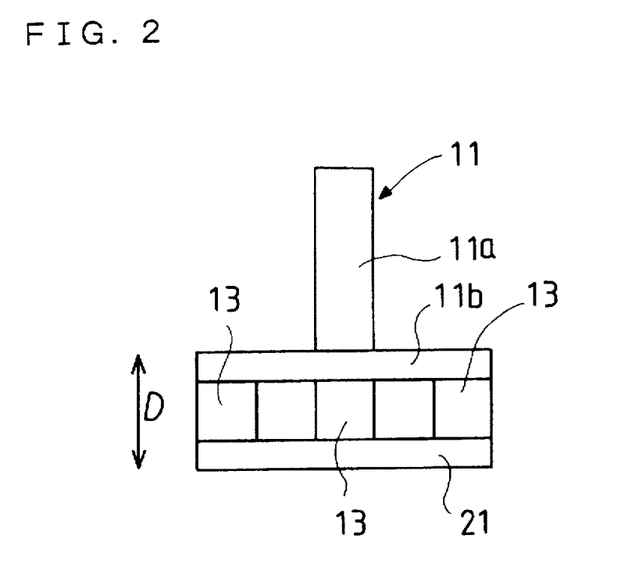
FIG. 2 is a front view of a stick member having piezoelectric elements in the pointing device according to the first embodiment.

First, the stick member 11, as shown in FIG. 2, has a cylindrical operational stick 11a to the lower end of which a square plate 11b for pressing the piezoelectric elements 13 is formed into one body therewith. The stick member 11 is formed of hard resin such as polycarbonate resin, etc.

Figure 3:
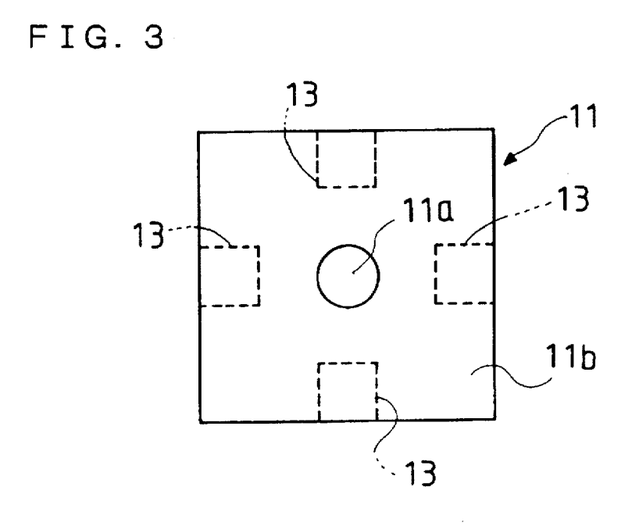
FIG. 3 is a plan view of the stick member having the piezoelectric elements in the pointing device according to the first embodiment.

Each of the piezoelectric elements 13 is arranged between the square plate 11b of the stick member 11 and a base plate 21 in retaining pressing state therebetween and as shown in FIG. 3, one piezoelectric element 13 is positioned at a central position of each of four sides in the square plate 11b. At this point, four piezoelectric elements 13 are arranged between the square plate 11b and the base plate 21. Each of the four piezoelectric elements 13 is formed of piezoelectric ceramics mainly composed of PZT (which is compound of lead titanate and lead zirconate) and is arranged so that the polarized direction thereof is directed along the vertical direction as indicated by an arrow D in FIG. 3. And both the upper surfaces and the lower surfaces of the piezoelectric elements 13 are adhered to the square plate 11b of the stick member 11 and the base plate 21, respectively. Further, electrodes (not shown) are formed on both the upper and the lower surfaces thereof by printing conductive ink and such electrodes are electrically connected to the voltage converting circuit 15 through a flexible printed circuit board (not shown).

Here, returning to FIG. 2, description will be continued. The voltage converting circuit 15 conducts processing such that the voltages produced in the piezoelectric elements 13 are amplified and converted into digital signals, thereafter the voltage converting circuit 15 transmits the signals corresponding to the voltage values produced in the piezoelectric elements 13 to the control part 19.

4

The control part 19 is constructed from a well-known microprocessor (MPU) 25 to which a RAM 27 and a ROM 29 are connected. In the ROM 29, various programs for controlling the MPU 25 are stored. And according to the program stored in the ROM 29, the MPU 25 detects the voltages of the piezoelectric elements 13 based on the signals transmitted from the voltage converting circuit 15 and stores such voltages in the RAM 27 as hold values under various conditions. Further, the MPU 25 transmits the signals for controlling cursor movement to the system board 17, corresponding to the hold values of voltages stored in the RAM 27. Here, the system board 17 moves the cursor on the display 31 in accordance with the signals from the control part 19.

Operation of the above constructed pointing device 1 will be given hereinafter with reference to FIGS. 4 and 5. Here, in FIG. 5, relation among stress exerted to the operational stick 11a of the stick member 11, voltage output from the piezoelectric elements 13, the hold value of the voltage stored in the RAM 27 and moving amount (moving distance) of the cursor, each of them being changed according to time lapse.

First, processing conducted by the control part 19 will be described with reference to the flowchart of FIG. 4. After processing is started, the signal from the voltage converting circuit 15 is read, thereby the voltage of the piezoelectric element 13 is detected in step (abbreviated "S" hereinafter) 1. Thereafter, in S13, it is judged whether the detected voltage lies in a range (shown in FIG. 5) where peak voltage is detected (this range is abbreviated as "peak detecting range", hereinafter). If judgement is "YES" in S13, it is judged in S15 whether the voltage exceeds the hold value stored in the RAM 27. If judged "NO" in S15, process returns to S1. And if judged "YES" in S15, the voltage detected in S11 is renewed as a new hold value and the renewed hold value is stored in the RAM 27. Further, in S19, the signal for controlling cursor movement is transmitted to the system board 17 based on the hold value. Thereafter, process returns to S11.

On the other hand, if judged in S13 that the voltage obtained in S11 does not lie in the peak detecting range (S13:NO), it is judged in S21 whether the voltage lies in a range (shown in FIG. 5) where the peak voltage is stored in the RAM 27 (this range is abbreviated as "peak storing range", hereinafter). If judged "YES" in S21, the hold value in the RAM 27 is not renewed and the signal for controlling cursor movement is transmitted to the system board 17 in S19, similarly to the above. Thereafter, process returns to S11. And if judged "NO" in S21, that is, the voltage detected in S11 lies in a zero level range shown in FIG. 5 (or the voltage is lower than the zero level range), the hold value stored in the RAM 27 is cleared in S23. Thereafter, process returns to S11.

Here, in order to easily understand process conducted according to flowchart in FIG. 4, operation of the pointing device 1 will be concretely described with reference to the timing chart shown in FIG. 5.

In the pointing device 1 of the first embodiment, in case that the cursor is moved on the display 31, the operator depresses the top portion of the operational stick 11a to a direction along which the operator desires to move the cursor. Then, as shown in the range A of FIG. 5, the stress exerted to the operational stick 11a abruptly increases in an immediate region that the operator depresses the operational stick 11a and thereafter the stress substantially becomes flat level from a certain point. At that time, the piezoelectric elements 13 receive the stress from the square plate 11b of the stick member 11. Thus, the peak voltage P shown in FIG. 5 is obtained.

Figure 4:
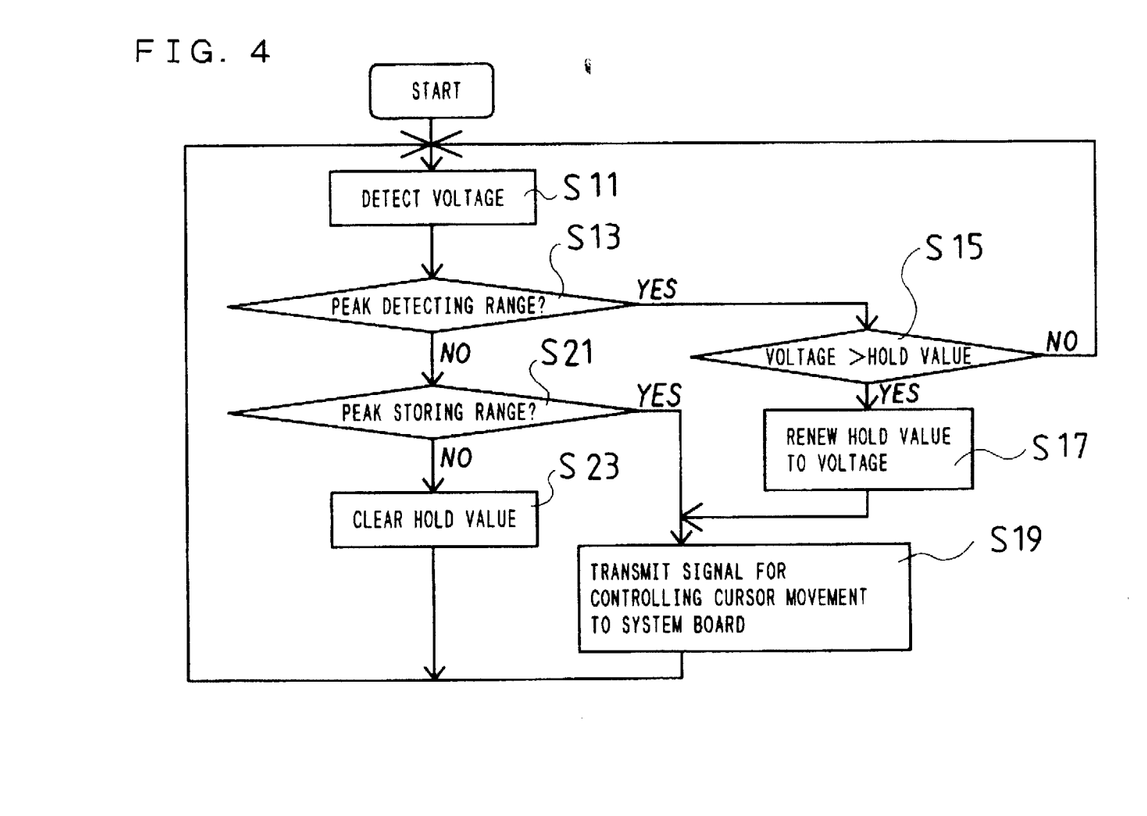
FIG. 4 is a flowchart of a control program for controlling cursor movement.
Figure 5:
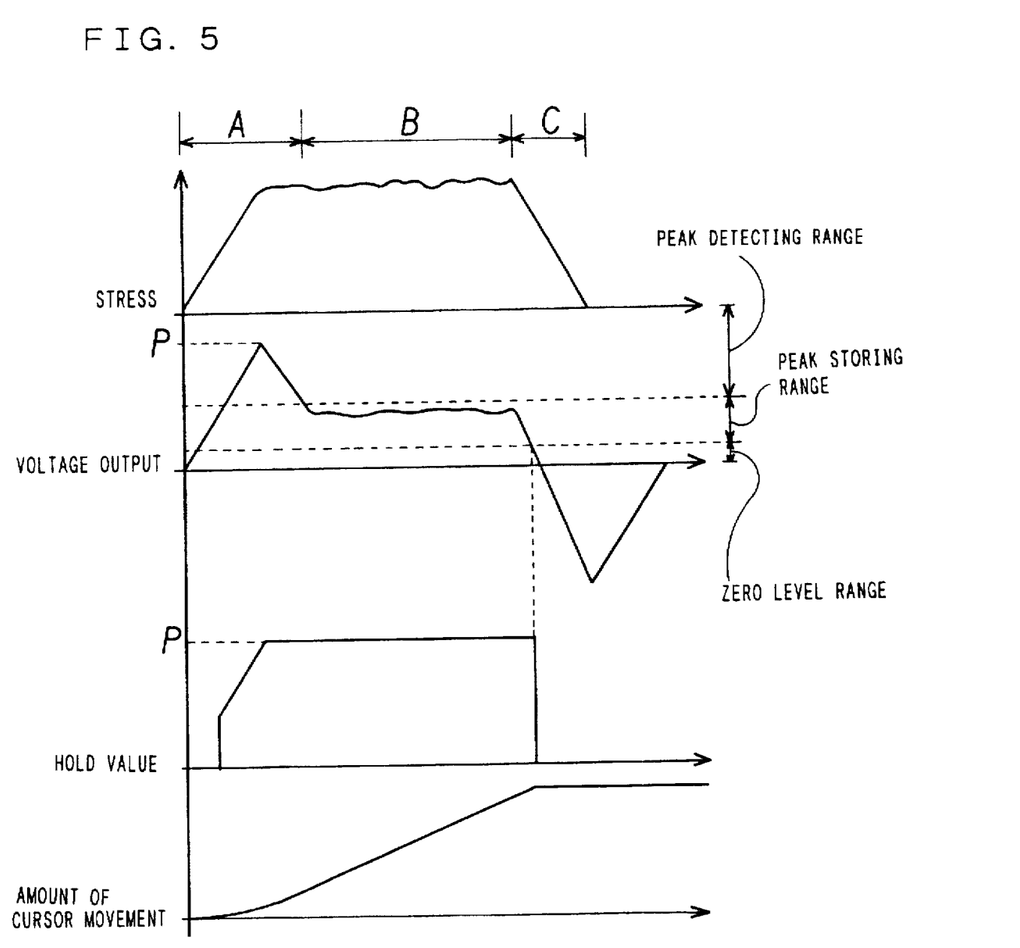
FIG. 5 is a timing chart showing operation of the pointing device.

Here, as explained according to flowchart in FIG. 4, the MPU 25 continuously detects the voltage (S11) and if the voltage increases and reaches in the peak detecting range (S13:YES) as shown in FIG. 5, the detected voltage is renewed as the hold value and stored in the RAM 27 (S15, S17). Therefore, the hold value concludes to reach the peak voltage P. And in case that the output voltage decreases after it once reaches to the peak voltage P, it continues that the peak voltage P is stored in the RAM 27 as it is, so long as the voltage higher than the peak voltage P is not detected.

Next, as shown in the range B of FIG. 5, if the operational stick 11a is continued to be depressed by exerting a constant stress thereto (in this case, since it is hard to exert a constant stress to the stick 11a by a finger, stress changes bit by bit in a certain range), charge produced in the piezoelectric element 13 is attenuated. At that time, though the output voltage is gradually decreased while changing bit by bit, the output voltage lies in the peak storing range (S21:YES). Therefore, based on this, it is judged that the finger is not released from the operational stick 11a and the hold value is retained to the peak voltage P without being cleared.

Further, based on the hold voltage value stored in the RAM 27, the electric signal is transmitted to the system board 17 from the control part 19 (S19) and the cursor is controlled to move on the display 31. Here, moving velocity of the cursor (that is, such velocity is represented by a gradient in the graph of FIG. 5, the graph representing moving amount of the cursor), is set so that it is proportioned to magnitude of the hold value.

Thereafter, when the operator releases the finger from the operational stick 11a, thereby the stress exerted to the stick 11a is decreased as shown in the range C of FIG. 5, the output voltage is abruptly decreased and reached to the zero level range (S21:NO). Then, the hold value stored in the RAM 27 is cleared (S23), as a result, cursor movement is stopped.

As mentioned in detail, in the pointing device 1 of the first embodiment, the stress exerted to the stick member 11 is converted through the piezoelectric element 13 and moving state of the cursor such as starting and stopping of the cursor, cursor movement (moving velocity of the cursor), is controlled according to outputting state of the voltage from the piezoelectric element 13.

Therefore, it can be obtained the following effects through the pointing device 1 of the first embodiment, in which the piezoelectric element 13 is utilized.

That is to say, the piezoelectric element 13 produces the voltage only corresponding to abrupt change of the stress exerted thereto and contrarily, scarcely produces the voltage corresponding to static stress. This means that the piezoelectric element 13 does not produce the voltage even if there exists static dispersion relating to the shape or material characteristic of the stick member 11 and the base plate 21, or arranging positions thereof. Thus, as understandable from the above, the piezoelectric element 13 has a function that such static dispersion is automatically amended. Therefore, in the pointing device 1 of the first embodiment, it is not necessary a control program through which complex amendment of the above static dispersion is conducted in order to dissolve influence by the static dispersion. As a result, moving state of the cursor can be easily controlled without the complex program.

And the pointing device 1 can be easily produced since the voltage from the piezoelectric element 13 is not affected by dispersion of the arranging position of the piezoelectric element 13. Further, cost of the pointing device 1 can be reduced since the piezoelectric element 13 with a simple construction is very cheap.

Further, in the first embodiment, not only the peak voltage P corresponding to the output voltage from the piezoelectric element 13 is detected, but also the peak voltage P is stored as the hold value in the RAM 27, thereby cursor movement is controlled based on the hold value while renewing thereof. Therefore, in case that the piezoelectric element, which does not produce so high voltage, is utilized, moving state of the cursor can be suitably controlled by storing the peak voltage P, which is produced immediately after the stick member 11 is depressed, as the hold value in the RAM 27.

Figure 6:
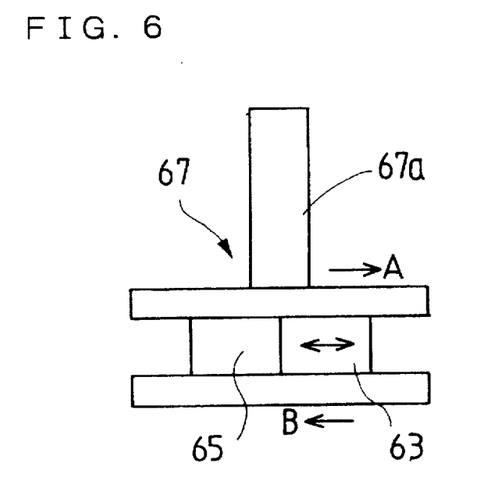
FIG. 6 is a front view of a stick member having piezoelectric elements in the pointing device according to the second embodiment.
Figure 7:
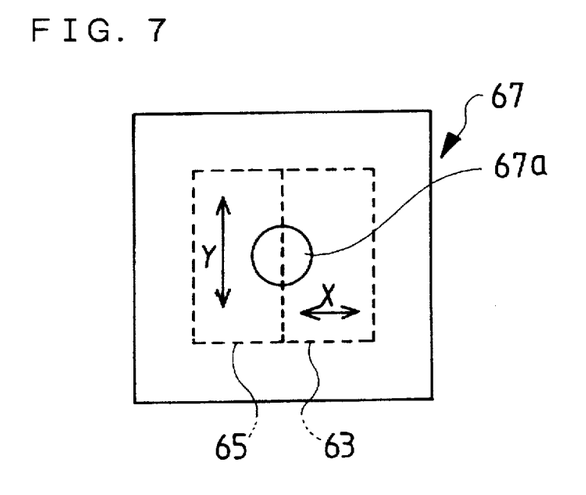
FIG. 7 is a plan view of the stick member having the piezoelectric elements in the pointing device according to the second embodiment.

Next, the second embodiment of the pointing device will be described referring to FIGS. 6 and 7. Here, the second embodiment is conceived, for instance, on the basis that various constructions, in which the stress exerted to the stick member can be converted to the voltage, is utilizable for the pointing device of the present invention without being limited to the shape of the stick member, the number and shape of the piezoelectric element. For instance, as shown in FIG. 6, two piezoelectric element (piezoelectric ceramics) 63, 65 are utilized in the second embodiment. And the polarized direction of the element 63 is indicated by an arrow X and the polarized direction of the elements 65 is indicated by an arrow Y, in FIG. 7. In this case, moving direction of the cursor is controlled by utilizing so-called a sliding vibration mode in a thickness direction of the piezoelectric elements 63, 65 among vibration modes occurring in the piezoelectric element. That is, as shown in FIG. 6, for example, when the stress is exerted on both the upper surface and the lower surface of the piezoelectric element 63 along the polarized direction X in mutually opposite directions indicated by arrows A and B, the voltage is produced between the upper surface and the lower surface of the piezoelectric element 63. Similarly to the piezoelectric element 63, when the stress is exerted on both the upper surface and the lower surface of the piezoelectric element 65 along the polarized direction Y in mutually opposite directions, the voltage is produced between the upper surface and the lower surface of the piezoelectric element 65. Therefore, if the operational stick 67a of the stick member 67 is depressed in the direction indicated by the arrow X, the voltage is produced in the piezoelectric element 63 and on the contrary, if the operational stick 67a is depressed in the direction indicated by the arrow Y, the voltage is produced in the piezoelectric element 65. As a result, the stress exerted to the operational stick 67a in all directions (up and down, right and left and various diagonal directions) can be detected by summing up vectors corresponding to the output voltages from the piezoelectric elements 63, 65. Therefore, the cursor can be controlled to move in all directions by only utilizing two piezoelectric elements 63 and 65, in the second embodiment.

Next, the third embodiment of the pointing device will be described referring to FIG. 8. Here, the third embodiment is conceived, for instance, on the basis that various methods for controlling cursor movement corresponding to the output state of the voltage from the piezoelectric element, is utilizable for the pointing device of the present invention without being limited by the above method.

For instance, as shown in FIG. 8, two threshold 1 and 2 are preset in the ROM 29 concerning with the voltage output from the piezoelectric element, in the third embodiment. Here, as understandable from FIG. 8, the threshold 1 has a higher voltage value than that of the threshold 2. And moving amount (moving distance) of the cursor and moving velocity of the cursor are controlled by stages based on each of the threshold 1 and threshold 2.

For example, as concerns moving amount of the cursor, it is supposed that moving amount of the cursor is set to a predetermined amount per unit time if the voltage output from the piezoelectric element lies between the threshold 1 and the threshold 2. Under such supposition, if the voltage from the piezoelectric element exceeds the threshold 1, moving amount of the cursor becomes larger than the above predetermined amount. On the other hand, if the voltage from the piezoelectric element is lower than the threshold 2, moving amount of the cursor becomes smaller than the predetermined amount.

And similarly to moving amount, as concerns moving velocity of the cursor, it is supposed that moving velocity of the cursor is set to a predetermined value if the voltage output from the piezoelectric element lies between the threshold 1 and the threshold 2. Under such supposition, if the voltage from the piezoelectric element exceeds the threshold 1, moving velocity of the cursor becomes larger than the above predetermined value. On the other hand, if the voltage from the piezoelectric element is lower than the threshold 2, moving velocity of the cursor becomes smaller than the predetermined value.

Further, moving amount or moving velocity of the cursor may be controlled based on the gradient obtained from voltage-curve shown in FIG. 8, except for the voltage.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A pointing device having a stick member for controlling cursor movement on a display, the pointing device comprising:

piezoelectric means comprising piezoelectric elements arranged in the stick member, the piezoelectric means converting a stress exerted to the stick member into a voltage; and control means for controlling cursor movement corresponding to an outputting state of the voltage converted by the piezoelectric means.

2. The pointing device according to claim 1, wherein the stick member has a square plate formed at a lower end of the stick member and a base plate and wherein the piezoelectric means is arranged between the square plate and the base plate.

3. The pointing device according to claim 2, wherein the square plate is formed of hard resin into one body with the stick member.

4. The pointing device according to claim 3, wherein the hard resin is polycarbonate resin.

5. The pointing device according to claim 2, wherein the piezoelectric means is constructed from four piezoelectric elements each of which is substantially positioned at a central position of each side of the square plate.

6. The pointing device according to claim 5, wherein the piezoelectric element is formed of piezoelectric ceramics mainly composed of compound of lead titanate and lead zirconate.

7. The pointing device according to claim 5, wherein the piezoelectric element is polarized in a direction parallel to the stick member.

8. The pointing device according to claim 1, wherein the voltage converted by the piezoelectric means has a characteristic to be classified in a peak detecting range which appears immediately after the stick member is depressed, a peak storing range which appears after the peak detecting range while the stick member is continued to be depressed and a zero level range which appears after the peak storing range when depression of the stick member is released.

9. The pointing device according to claim 8, wherein the control means comprises;

detection means for detecting the voltage produced in the piezoelectric means;

first judgement means for judging whether the voltage detected by the detection means lies in the peak detecting range;

memory means for storing the voltage as a hold value;

renewal means for judging whether the voltage detected by the detection means is larger than the hold value stored in the memory means if judged by the first judgement means that the voltage lies in the peak detecting range and renewing the hold value to the voltage as a new hold value when the voltage is larger than the hold value; and cursor control means for controlling cursor movement based on a signal corresponding to the renewed hold value.

10. The pointing device according to claim 9, the control means further comprises;

second judgement means for judging whether the voltage detected by the detection means lies in the peak storing range or in the zero level range;

wherein the cursor is controlled to move on the display if judged by the second judgement means that the voltage lies in the peak storing range and the hold value in the memory means is cleared if judged by the second judgement means that the voltage lies in the zero level range.

11. The pointing device according to claim 2, wherein the piezoelectric means constructed from two piezoelectric elements each of which is substantially positioned at a central position of the square plate and the base plate.

12. The pointing device according to claim 11, wherein the piezoelectric elements are polarized in directions which are orthogonally crossed with each other.

13. The pointing device according to claim 12, wherein the control means controls cursor movement by detecting the stress exerted to the stick member in all directions in summing up vectors corresponding to the voltages from the piezoelectric elements.

14. The pointing device according to claim 1, further comprising;

curve formation means for continuously forming voltage curve based on the voltage from the piezoelectric means;

set means for setting plural threshold values in the voltage curve formed by the curve formation means;

wherein the control means controls cursor movement by stages based on the threshold values set by the set means.

15. A pointing device having a stick member for controlling cursor movement on a display, the pointing device comprising:

piezoelectric elements arranged in the stick member, each of the piezoelectric elements converting a stress exerted to the stick member into a voltage;

a voltage converting circuit for converting the voltage produced in the piezoelectric element into a digital signal corresponding to the voltage;

a control part having a memory for detecting the voltage based on the digital signal from the voltage converting circuit and storing the detected voltage in the memory; and a system board for controlling cursor movement on the display based on an electric signal corresponding to the voltage stored in the memory.

* * * * *